Figure 2:
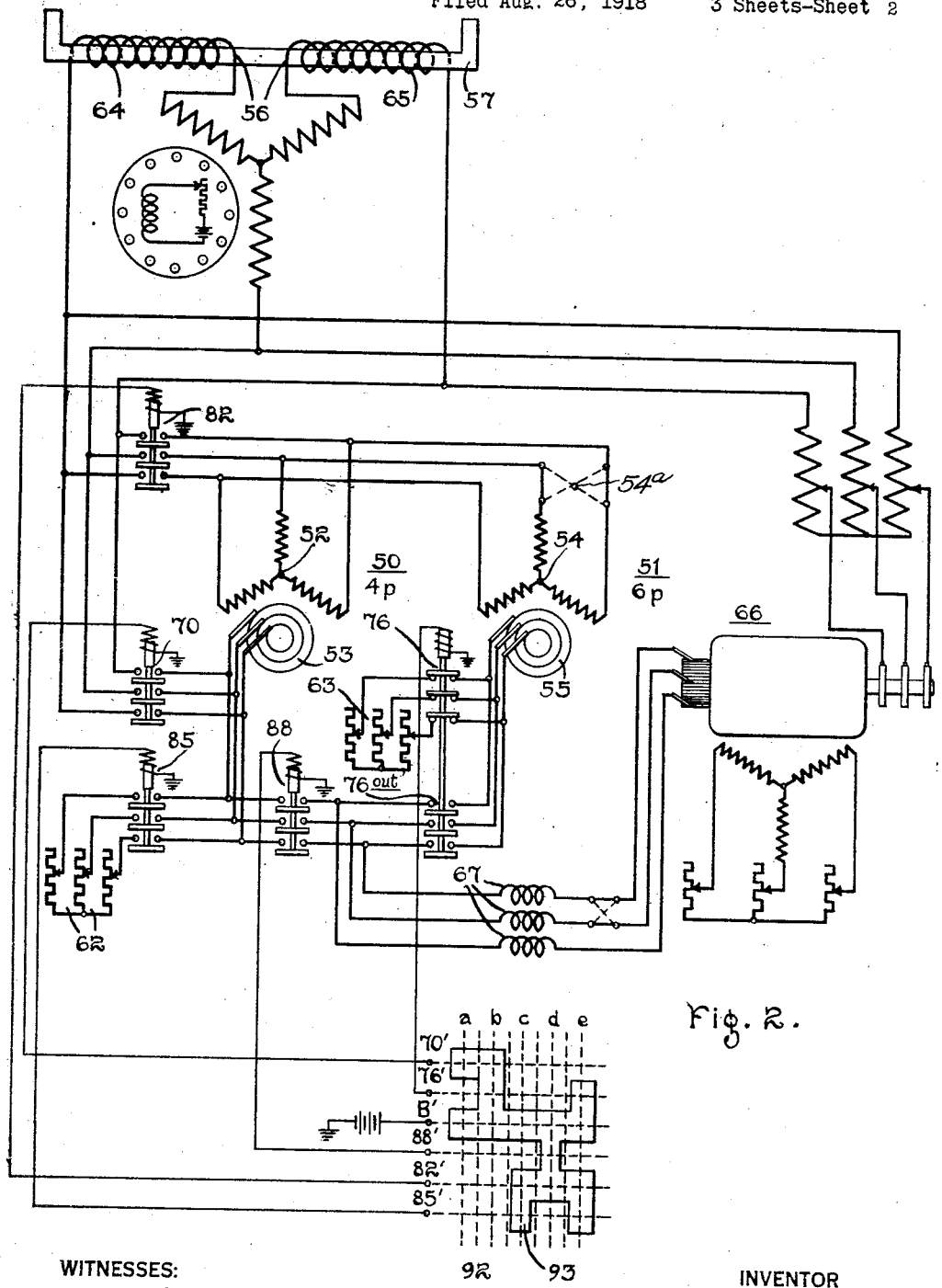

March 17. 1925.  
R. E. HELLMUND  
1,529,787  
INDUCTION MOTOR SYSTEM FOR LOCOMOTIVES  
Filed Aug. 26, 1918  3 Sheets-Sheet 1
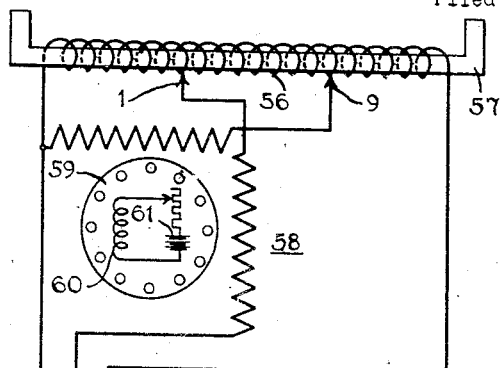
Fig. 1.
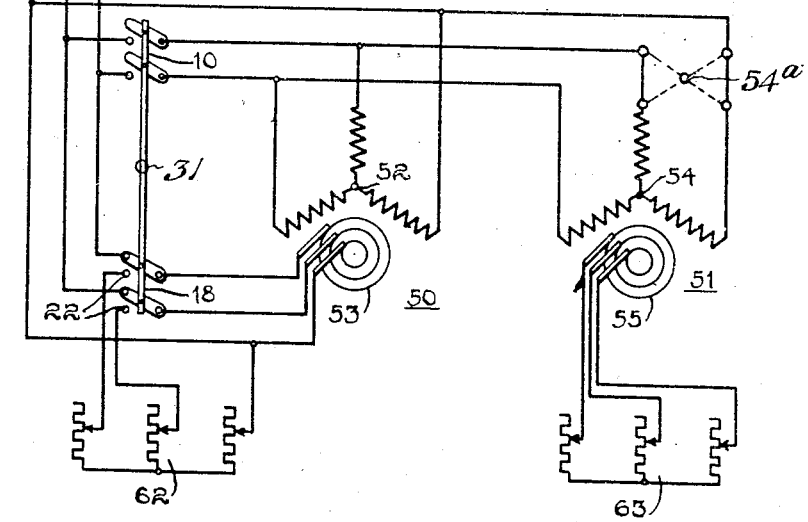
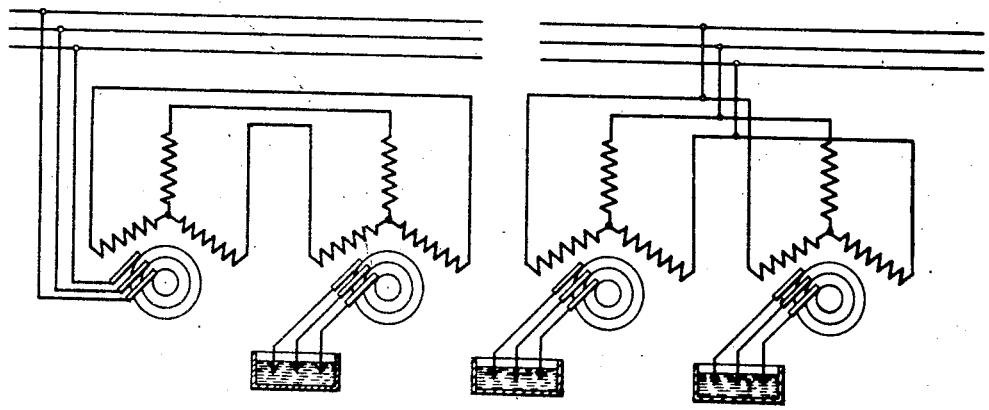
WITNESSES: Fig. 1a. Fig. 1b.  
INVENTOR  
Rudolf E. Hellmund  
BY  
ATTORNEY March 17, 1925.

R. E. HELLMUND 1,529,787

INDUCTION MOTOR SYSTEM FOR LOCOMOTIVES

Filed Aug. 26, 1918  3 Sheets-Sheet 3

0-150 R.P.M.  300-500 R.P.M.

150-300 R.P.M.
(Synchronous
10-pole speed)

500 R.P.M.
(Synchronous
6-pole speed.)

500-750 R.P.M.
(Synchronous
4-pole speed)

WITNESSES:
C. M. Cochran
O. B. Buchanan

INVENTOR.
Rudolf E. Hellmund.
BY
Eberley G. Carr
ATTORNEY

Patented Mar. 17, 1925.

1,529,787

UNITED STATES PATENT OFFICE.

RUDOLF E. HELLMUND, OF SWISSVALE, PENNSYLVANIA, ASSIGNOR TO WESTINGHOUSE ELECTRIC & MANUFACTURING COMPANY, A CORPORATION OF PENNSYLVANIA.

INDUCTION-MOTOR SYSTEM FOR LOCOMOTIVES.

Application filed August 26, 1918. Serial No. 251,379.

*To all whom it may concern:*

Be it known that I, RUDOLF E. HELLMUND, a citizen of the German Empire, and a resident of Swissvale, in the county of Allegheny and State of Pennsylvania, have invented a new and useful Improvement in Induction-Motor Systems for Locomotives, of which the following is a specification.

My invention relates to induction-motor systems for electric locomotives, and it has for its object to provide such a system which shall be capable of imparting several economical speeds to an electric locomotive and, at the same time, provide materially greater torque at low speeds than at high speeds.

In the operation of electric locomotives, it is especially desirable to so control the propelling means associated therewith that materially greater torques are developed at low, or starting, speeds than at high, or running speeds. In the past, these conditions have been fulfilled with two-speed induction motors. However, two-speed motors require a large number of leads, slip rings and brushes, all of which are frequently difficult to locate in connection with railway motors, since the space available between the wheels of such vehicles is ordinarily limited.

I propose, therefore, to provide an induction-motor system which may be operated to attain the above described objects without the association therewith of the above mentioned undesirable auxiliary apparatus.

To this end I provide a plurality of induction motors with which in some forms of my invention, is associated a commutator regulating machine. The motors, in this particular instance, have stator windings the effective number of turns of which exceeds that of the rotor windings, and the system of control is such that, for their low, or starting, speeds, they are connected in cascade and one of those members which contains the lesser number of effective turns is supplied with energy. Under these conditions, a stronger field than normal will be provided and, subsequently, a much higher torque will be developed, all of which is especially desirable at such speeds.

On the other hand, during running speeds, the control system is such that the other members, namely those having the larger number of effective turns, are supplied with energy whereby more efficient operation at such speeds is obtained and, at the same time, a relatively lower torque is developed than is developed during the starting or low-speed operation.

For a better understanding of my invention, reference may be had to the accompanying drawing, in which:

Fig. 1 illustrates a system constructed in accordance with my invention, the regulating machine, however, not being shown; Figs. 1a and 1b are diagrammatic views illustrating successive steps in the operation of the system shown in Fig. 1; Fig. 2 represents a system similar to that shown in Fig. 1 but supplied with a more desirable phase-converter and, in addition, with a commutator regulating machine; Figs. 2a to 2e, respectively, are diagrammatic views illustrating successive steps in the operation of the system shown in Fig. 2.

Referring more particularly to Fig. 1, two propulsion motors of the induction type 50 and 51 are shown. The motors 50 and 51 are provided, respectively, with stator members 52 and 54 and with rotor members 53 and 55. A source of energy supply, here shown as a secondary winding 56 of a transformer 57, is indicated as connected to the motors 50 and 51 through a phase-converter 58, this phase-converter being provided with a secondary member 59 having a direct-current field winding 60 supplied from any suitable source of energy such, for instance, as a battery 61. By means of the direct-current winding with which the rotor 59 of the converter 58 is provided, synchronous operation and adequate power-factor control may be secured.

Variable rheostats 62 and 63 are shown associated with the members 53 and 55 of the propulsion motors. Adjustable taps 1 and 9, are associated with the source of supply 56 and the phase-converter 58 in order to control the voltage supplied thereto, while a switch 10 provides means whereby the stator members 52 and 54 may be supplied with energy. A switch 18 is associated with the rotor 53 of the motor 50 for a like purpose, while back contacts 22 on the switch 18 provide means whereby the rheostat 62 may be connected in the secondary circuits of the motor 50 for purposes hereinafter to be described. The switches 10 and 18 are united, to constitute a common switch, having the handle 31, whereby the switch 10 and the back contacts 22 are simultaneously closed.

It will be understood, in connection with the above description of Fig. 1, that the members 52 and 54 of the motors are provided with a larger number of effective turns than the members 53 and 55, thereby providing means for securing the desired torque relationship at starting and running speeds.

Referring now to Fig. 2, the motors 50 and 51 are again shown as connected to the source of energy 56. In this figure, however, the secondary 56 of the transformer 57 is shown as divided into two parts 64 and 65. The converter here illustrated is claimed in a copending application Serial No. 206,921 of L. W. Chubb, filed December 13, 1918, and assigned to the Westinghouse Electric & Mfg. Company.

A commutator regulating machine 66 is shown and is adapted to be connected in the rotor circuit 53 or the rotor circuit 55 of the motors 50 and 51, respectively, an inductive member 67 being inserted between the secondaries 53 and 55 and the frequency changer 66. For a more detailed description of the frequency changer here employed, reference may be had to U. S. Patent 1,235,583, issued to the Westinghouse Electric & Mfg. Company on Aug. 7, 1917, upon an application filed by F. W. Meyer.

In order to operate in the desired manner, the stator members 52 and 54 of the motors are provided with a larger number of turns than the rotors 53 and 55, as described in connection with Fig. 1, and, at the same time, the motor 51 is of a higher pole number than the motor 50. A switch 70 provides means whereby the member 53 of the motor 50 may be connected, through the phase-converter, to the source of energy supply. A switch 76 is provided to permit connecting any suitable rheostat 63, in the circuit of the rotor member 55, while a switch "76 out" provides the necessary connections between the member 55 and the frequency changer 66.

A switch 82 is provided to admit of the necessary connections whereby the two stators may be connected to the source of supply, while a switch 88 provides for connecting the frequency changer 66 directly with the rotor member 53 and, finally, a switch 85 provides means whereby the rheostat 62 may be connected to the rotor member 53 when desired.

Having now described a general system constructed in accordance with my invention, as well as a specific modification thereof, the operation thereof is as follows:

Referring to Fig. 1 and the sequence diagrams, Figs. 1a and 1b, it will be noted that, when the stator members 52 and 54 are connected for parallel operation, energy is fed to these members as primary members, while, when the set of induction motors is connected for cascade operation, the member 53 is supplied with energy and is the primary member. In this manner, it is possible to obtain any desired ratio of torque for the two speeds, the average losses in each case being kept at a minimum and, moreover, a power factor of the maximum value possible and desirable torque conditions are secured.

It will be further observed, in this connection, that the phase-converter is to be adjusted to give a greater degree of balancing in the 3-phase currents during cascade operation than is possible during parallel operation. This is because of the fact that, with cascade operation, one of the motors must carry double magnetizing currents and, in order to keep the heating of this motor at a minimum, it is necessary to have well balanced phases. On the other hand, the kilowatt input during cascading is usually smaller than during parallel operation and, therefore, the phase converter may be quite small and still furnish fully balanced currents without being subjected to excessive heating.

Moreover, during parallel operation, the motor power factor is quite good; and, for this reason, especially if the motor torque is less than during cascading, the motor heating is relatively small at that time and, therefore, a certain amount of unbalancing in the motor phases is permissible. On the other hand, such unbalancing will be beneficial to the converter which would otherwise have to be quite large in order to furnish fully balanced currents for the large kilowatt input which is necessary when the induction-motor aggregate is operated with the parallel connection. Such different degree of phase balancing may be obtained by the proper manipulation of the taps 1 and 9.

Turn now to the system shown in Fig. 2, in which a frequency changer is associated with the motors and, at the same time, one of the motors employed is of a higher pole number than the other. The other structure therein is as described in connection with Fig. 1. It will be observed, however, in connection with Fig. 2, that more than the usual number of economical speeds is possible.

In this particular case, wherein, for purposes of illustration, the main motors may be considered as of 4 and 6 poles, respectively, the frequency-changer may be so designed as to give one-half line frequency with the current-carrying capacity of one of the motors. Its maximum capacity is, therefore, one-half of the capacity of one of the motors or one-fourth of the total motor capacity.

For purposes of illustration, I will assume that the speeds reached are those which will result from the use of 4-pole and 6-pole motors on a 25-cycle supply line. However, it will be understood that any other unequal-pole-number motors may be employed and, in fact, as difference in the number of poles of the two machines increases, the capacity of the regulating machine correspondingly decreases, and the maximum efficiency is still realized for several economical speeds.

Figures 2A, 2C:
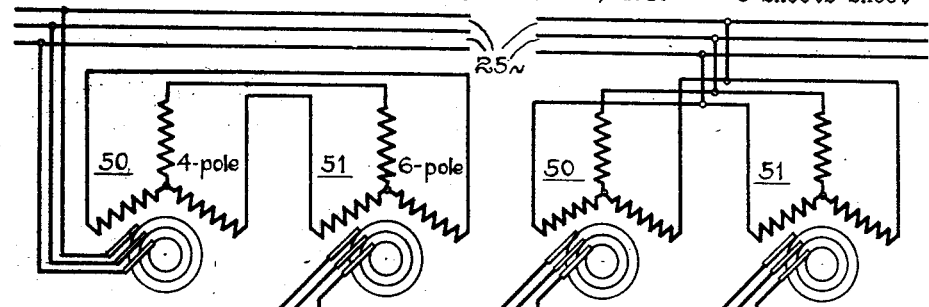
Figure 2B:
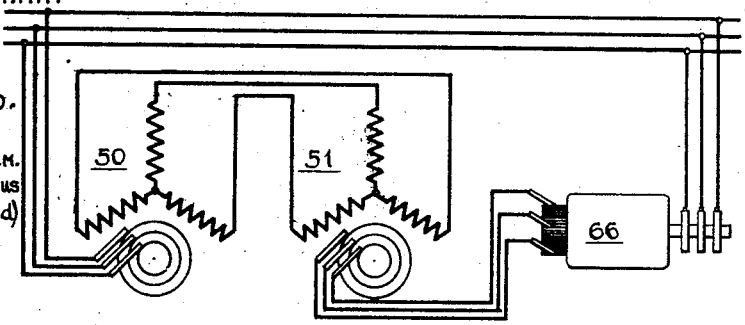
Figure 2D:
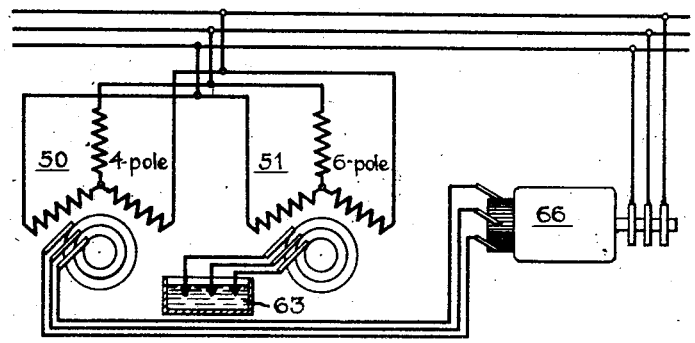
Figure 2E:
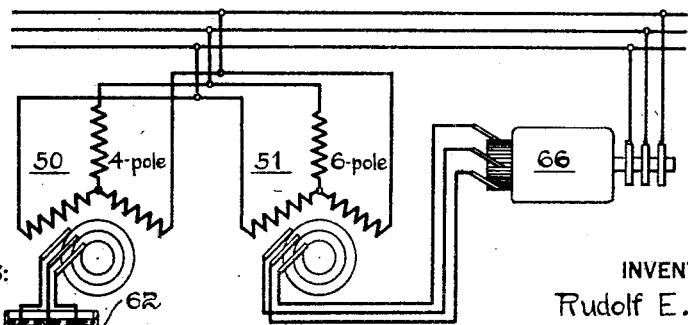

In Fig. 2, the switches are shown as electromagnetic switches or relays which are controlled by means of a drum controller 92, comprising a properly cut cylindrical contact member 93 and a row of stationary contacts 70', 76', B', 88', 82' and 85', which are connected to the correspondingly numbered switches and to the battery B, respectively. The controller provides five operating positions, lettered a to e, respectively, and the corresponding circuit connections are shown in Figs. 2a and 2b, respectively.

Referring now to Fig. 2, it will be observed that the motors are first connected in cascade and accelerated by means of the resistance 63 up to approximately 150 R. P. M. The rotor of the motor 51 is then connected to the frequency changer and, by adjusting the frequency of the latter machine through the resistance inserted in its stator and voltage supplied to the slip rings, economical operation without resistance losses will be obtained all the way from 150 to 300 R. P. M.

In order to further increase the speed, the two stators are now connected in parallel, the primaries being conected to the line and the two rotors being connected to the rheostats, as shown. With this connection, the motors are accelerated to 500 R. P. M.

At this speed, the frequency changer is connected to the rotor of the 4-pole motor in order that the speed of the lower pole number motor may be maintained economically at approximately 500 R. P. M. while the 6-pole motor will run at that speed with its secondary short circuited, since this is the normal synchronous speed for the 6-pole motor.

It will be observed that whenever the connections are changed from cascade to parallel operation, or vice versa, the reversing switch 54ª which is shown in dotted lines in Figs. 1 and 2, will have to be operated in order to maintain the same direction of operation of both motors.

Now, reversing the above described conditions, the 4-pole motor is connected to the rheostat while the secondary of the 6-pole motor is connected to the frequency changer in such a direction as to operate with over-synchronous speed. The motors are then accelerated by reducing one of the resistances 62 and by increasing the frequency of the machine 66 until approximately 750 R. P. M. is reached when the rotor 53 may be short circuited and economical operation at the speed last named will be obtained.

It will be observed, therefore, that it is possible to obtain, with a relatively small auxiliary machine, a large number of economical speeds by the simple expedient of so connecting the auxiliary machine that it alternately serves to choke down the speed of one motor of a set and, at other times, serves to bring up the speed of the other motor of such a set. While I have shown but one modification of my invention wherein such sequence of operation is illustrated, I believe this process to be new in the art and do not, therefore, desire to be limited to the specific embodiment of my invention which I have described.

While I have described but two modifications of my invention, it is, of course, entirely possible that many other embodiments may occur to those skilled in the art and I desire, therefore, that only such limitations shall be placed thereon as are imposed by the prior art or are specifically set forth in the appended claims.

I claim as my invention:

1. The combination with a plurality of induction motors each having a stator member and a rotor member, and a source of energy supply for said motors, of means for operating said motors in parallel and in cascade connection, each of said motors being operated with one of its members connected to said source during parallel operation, and the other member of one of the motors being connected to said source during cascade operation, the last-mentioned member having a field winding of a smaller number of turns than the other member of the motor.

2. The combination with a plurality of induction motors and a source of energy supply therefor, of a phase converter inserted between said motors and said source, said motors being of different pole numbers, and a regulating machine associated with said motors, said regulating machine being arranged to operate in combination with any of said motors.

3. The combination with two induction motors having different pole numbers, of a regulating machine associated with said motors to bring the speed of one of said motors to approximately the synchronous speed of the other of said motors and vice versa.

4. The combination with two induction motors having different pole numbers, of a regulating machine associated with said motors to bring the speed of one of said motors to approximately the synchronous speed of the other of said motors and vice versa, means for connecting said motors in parallel and in cascade, and means for connecting said regulating machine to the rotor of one of said motors at times, and for connecting said machine to the rotor of the other of said motors at other times, whereby more than two economical speeds are obtained.

5. The combination with two induction motors having different pole numbers, of a regulating machine associated with said motors to bring the speed of one of said motors to approximately the synchronous speed of the other of said motors and vice versa, and means for so connecting said regulating machine with said motors that the requisite maximum capacity of said regulating machine is substantially less than one half of the capacity of said motors.

6. The method of obtaining more than two economical speeds with an induction-motor aggregate comprising two motors of different pole numbers, which consists in associating a regulating machine with said motors, connecting said motors in cascade and accelerating said aggregate to normal cascade synchronous speed, with said regulating machine connected in the secondary member of said cascaded aggregate, then connecting said motors in parallel and accelerating said aggregate to synchronous speed of said higher pole-number motor, with said regulating machine connected in the secondary member of said lower pole-number machine, and finally connecting said regulating machine in the secondary member of the higher pole-number motor and accelerating said aggregate to the synchronous speed of said lower pole-number motor.

7. The method of utilizing a regulating machine to operate two induction motors having different pole numbers, which consists in connecting the regulating machine alternately to operate the lower-pole-number motor at a sub-synchronous speed corresponding to the normal speed of the higher-pole-number motor and to operate the higher-pole-number motor at a hyper-synchronous speed corresponding to the normal speed of the lower-pole-number motor.

8. The combination with a plurality of induction machines, of a regulating machine adapted to be connected in the secondary of said machines, and an inductive device connected between said regulating machine and the secondary of said induction machines, whereby undesirable currents are precluded from flowing therebetween.

9. A cascade-parallel induction motor set including the combination with supply leads, of two induction motors, each having two members rotatable one with respect to the other, means for electrically connecting one member of one motor with one member of the other, the other member of one of said motors being provided with terminal conductors, switching means for connecting said terminal conductors to said supply leads, switching means for close-circuiting said terminal conductors and switching means for connecting said connecting means to said supply leads, the member which is provided with said terminal conductors having a different number of effective turns than the other member of the motor.

10. A motor system comprising an induction motor provided with stator and rotor members, one of said members having a smaller number of effective turns than the other, a second induction motor, means for connecting said motors in cascade with the energy supplied to said member having the smaller number of effective turns, and alternative means for connecting said motors in parallel with the energy supplied to said member having the larger number of effective turns.

In testimony whereof, I have hereunto subscribed my name this 24th day of Aug. 1918.

RUDOLF E. HELLMUND.